(12) United States Patent  
Engelbart

(10) Patent No.: US 8,524,023 B2  
(45) Date of Patent: Sep. 3, 2013

(54) METHODS AND SYSTEMS FOR FABRICATION OF COMPOSITE ARMOR LAMINATES BY PREFORM STITCHING

(75) Inventor: Roger W. Engelbart, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 12/825,766

(22) Filed: Jun. 29, 2010

(65) Prior Publication Data

US 2011/0315304 A1     Dec. 29, 2011

Related U.S. Application Data

(62) Division of application No. 11/856,161, filed on Sep. 17, 2007, now Pat. No. 7,752,955.

(51) Int. Cl.
*B32B 37/18* (2006.01)
*F41H 5/00* (2006.01)

(52) U.S. Cl.
USPC ............. 156/70; 156/93; 156/292; 156/285; 428/73; 89/36.02; 112/475.08

(58) Field of Classification Search
USPC ................. 89/36.01–36.17; 428/68, 72, 73; 156/70, 292, 293, 93, 285; 264/101, 510; 112/475.01, 475.08
See application file for complete search history.

(56) References Cited

U.S. PATENT DOCUMENTS

| | | | |
|---|---|---|---|
| 3,616,115 A | 10/1971 | Klimmek et al. | |
| 3,715,999 A | 2/1973 | Shwayder | |
| 3,793,648 A * | 2/1974 | Dorre et al. | ............ 2/2.5 |
| 3,924,038 A | 12/1975 | McArdle et al. | |
| 4,604,312 A | 8/1986 | Creighton et al. | |
| 4,822,657 A | 4/1989 | Simpson | |
| 4,911,061 A | 3/1990 | Pivitt et al. | |
| 4,928,575 A | 5/1990 | Smirlock et al. | |
| 4,969,386 A | 11/1990 | Sandstrom et al. | |

(Continued)

FOREIGN PATENT DOCUMENTS

| | | |
|---|---|---|
| DE | 4119948 A1 | 12/1992 |
| EP | 2036715 A1 | 3/2009 |

(Continued)

OTHER PUBLICATIONS

European Search Report for Application No. 08016353.8-2124; Dec. 9, 2008; 6 pages.

*Primary Examiner* — Katarzyna Wyrozebski Lee
*Assistant Examiner* — Scott W Dodds
(74) *Attorney, Agent, or Firm* — Armstrong Teasdale LLP

(57) ABSTRACT

Methods and systems for an armor system are provided. The system includes a first face sheet and a shaped preform extending from the first face sheet. The preform includes a first edge proximate the first face sheet, a sidewall extending from the first edge to a flange extending substantially perpendicularly from the sidewall. The preform circumscribes an area of the first face sheet. The system also includes a tile of armor material complementarily-shaped to fit within the area circumscribed by the preform. The tile is positioned within the preform such that at least a portion of the tile is between the first face sheet and the flange. The system includes a second face sheet covering the preform and the tile on a side opposite from the first face sheet.

14 Claims, 6 Drawing Sheets

(56) References Cited

U.S. PATENT DOCUMENTS

| | | | |
|---|---|---|---|
| 5,045,371 A | 9/1991 | Calkins | |
| 5,191,166 A | 3/1993 | Smirlock et al. | |
| 5,317,950 A * | 6/1994 | Binon et al. | 89/36.02 |
| 5,349,893 A | 9/1994 | Dunn | |
| 5,686,689 A | 11/1997 | Snedeker et al. | |
| 5,705,764 A | 1/1998 | Schade et al. | |
| 5,849,393 A | 12/1998 | Slattery | |
| 6,082,240 A | 7/2000 | Middione et al. | |
| 6,332,390 B1 | 12/2001 | Lyons | |
| 6,418,832 B1 | 7/2002 | Colvin | |
| 6,532,857 B1 | 3/2003 | Shih et al. | |
| 6,601,497 B2 | 8/2003 | Ghiorse et al. | |
| 6,792,843 B2 | 9/2004 | Mohr et al. | |
| 6,826,996 B2 | 12/2004 | Strait | |
| 7,077,306 B2 | 7/2006 | Palicka et al. | |
| 7,198,860 B2 | 4/2007 | Vance | |
| 7,225,717 B2 | 6/2007 | Williams | |
| 7,350,450 B1 | 4/2008 | Chu et al. | |
| 7,703,375 B1 * | 4/2010 | Scott et al. | 89/36.02 |
| 7,752,955 B2 | 7/2010 | Engelbart | |
| 8,069,494 B2 | 12/2011 | Sundnes | |
| 8,087,143 B2 | 1/2012 | Dipietro | |
| 8,151,685 B2 | 4/2012 | Joynt | |
| 2007/0039267 A1 | 2/2007 | Swanson | |
| 2008/0092730 A1 * | 4/2008 | Hall | 89/36.04 |
| 2009/0072569 A1 | 3/2009 | Engelbart | |

FOREIGN PATENT DOCUMENTS

| | | |
|---|---|---|
| JP | 2009068835 A | 4/2009 |
| NL | 1014981 C2 | 10/2001 |
| NL | 1015633 C | 12/2001 |
| WO | 9837376 A1 | 8/1998 |

\* cited by examiner

METHODS AND SYSTEMS FOR FABRICATION OF COMPOSITE ARMOR LAMINATES BY PREFORM STITCHING

CROSS REFERENCE TO RELATED APPLICATIONS

This application is a divisional application of application serial number 11/856,161 filed Sep. 17, 2007 now U.S.Pat. No. 7,752,955, which is hereby incorporated by reference in its entirety.

STATEMENT REGARDING FEDERALLY SPONSORED RESEARCH & DEVELOPMENT

The invention was made with Government support under Contract Number W911NF-05-2-0025 awarded by the Army. The Government has certain rights in this invention.

BACKGROUND

Embodiments of the disclosure relate generally to composite armor laminates and more particularly, to methods and systems for fabricating composite armor laminates.

At least some known armor systems include a dense ceramic tile enclosed in a supporting structure such as a composite sheet material. The ceramic tile is positioned within the supporting structure to receive ballistic missiles and substantially prevent the missile from passing through the armor system and into an occupied cabin of the vehicle. During impact, one or more tiles may be directly impacted by the missile and other adjacent tiles not directly impacted by the missile may impart forces onto adjacent tiles. A composite spacer positioned between the tiles may limit the amount of damage to the adjacent tiles by absorbing at least a portion of the forces imparted by the tiles that were directly impacted by the missile. During assembly of the armor system, the composite spacer is positioned between tiles manually during layout of the armor system components. This process is time consuming and manual labor intensive.

SUMMARY

In one embodiment, an armor system includes a first face sheet and a shaped preform extending from the first face sheet. The preform includes a first edge proximate the first face sheet, a sidewall extending from the first edge to a flange extending substantially perpendicularly from the sidewall. The preform circumscribes an area of the first face sheet. The system also includes a tile of armor material complementarily-shaped to fit within the area circumscribed by the preform. The tile is positioned within the preform such that at least a portion of the tile is between the first face sheet and the flange. The system includes a second face sheet covering the preform and the tile on a side opposite from the first face sheet.

In another embodiment, a method of forming a ballistic resistant armor laminate includes providing a first face sheet and at least one of forming an integral preform with the first face sheet and coupling a shaped preform to the first face sheet wherein the preform extends from a face of the first face sheet to a distal edge and wherein the preform circumscribes an area of the face. The method also includes positioning a tile of armor material within the area circumscribed by the preform, forming a flange from the distal edge of the preform wherein at least a portion of a toe of the flange extends substantially parallel to the face and covers at least a portion of the tile, and coupling a second face sheet to the flange to such that the preform and tile are sandwiched between the first and second face sheets.

In yet another embodiment, an armored vehicle includes a vehicle hull and an armor system covering at least a portion of the hull. The armor system includes a plurality of face sheets parallelly oriented with respect to each other and a shaped preform extending from a face of a first of the plurality of face sheets to a face of an adjacent second of the plurality of face sheets, the preform joining the first and the second face sheets. The vehicle also includes a plurality of tiles of armor material sandwiched between the first and the second sheets and the preform.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of forming composite armor laminates. However, it is contemplated that this disclosure has general application to manufacturing components and assemblies where materials may be joined to form larger subsystems of panels and/or sheets that heretofore required significant manual labor to assemble.

Figure 1:
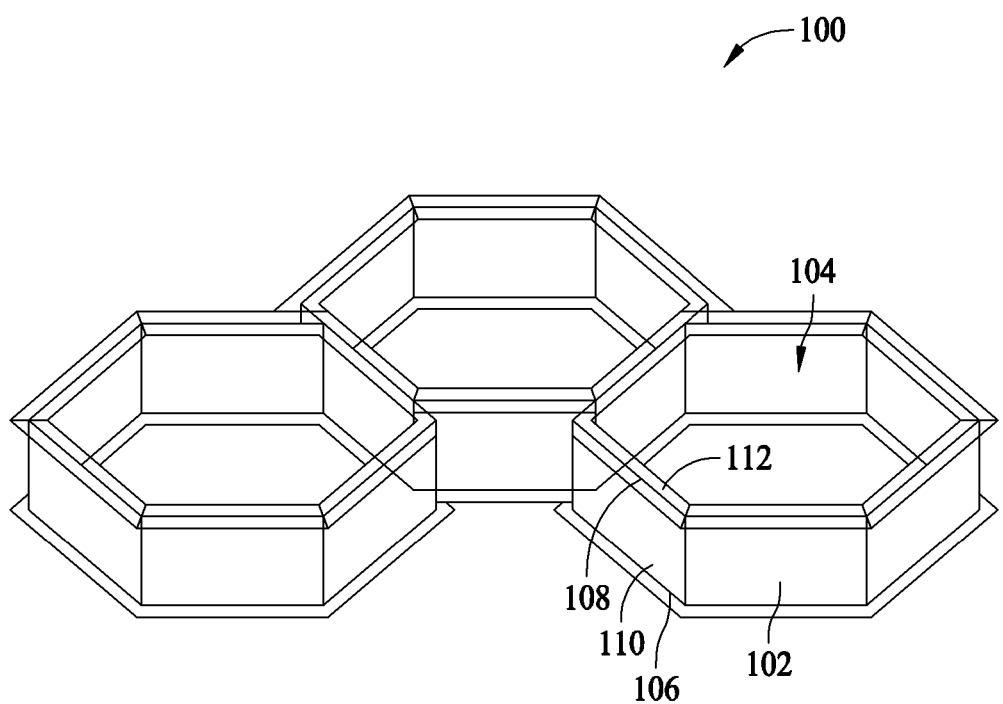
FIG. 1 is a perspective view of an exemplary preform in accordance with an embodiment of the present invention.

FIG. 1 is a perspective view of an exemplary preform 100 in accordance with an embodiment of the present invention. Preform 100 includes a sidewall 102 that is configurable to a plurality of different shapes. Preform 100 is illustrated in FIG. 1 in a hexagonal shape, but any shape or amorphous contour is contemplated. Perform 100 is formed in a closed configuration such that a cell 104 is circumscribed by preform 100. Preform 100 may include a single cell 104 or may include a plurality of cells. In the exemplary embodiment, cells 104 are sized and shaped complementary to a predetermined size and shape of a tile of armor material to be received therein. In one embodiment, preform 100 is formed from a web of material in a desired shape. In other embodiments, preform 100 is formed from a continuous composite fiber wound through a form or mandrel (not shown) having the desired shape. A number of passes or turns of the continuous composite fiber that are channeled through each leg of the cell is determined based on a force absorption or strength requirement of the preform. The continuous composite fiber may comprise, but is not limited to a carbon fiber, a fiber glass fiber, an aromatic polyamide fiber such as Aramid™, other fiber filaments or combinations thereof. The continuous composite fiber may also comprise, but is not limited to, a thread, a tow, or a web comprising the above materials. The fiber, web, or tow may be impregnated with an adhesive, a thermoplastic, or a thermoset.

In the exemplary embodiment, sidewall 102 includes a first edge 106, a second edge 108, and a sidewall 110 extending therebetween. In the exemplary embodiment, each of edges 106 and 108 include a flange 112 extending substantially perpendicularly away from sidewall 110. In various embodiments, flange 112 comprises a single toe extending from one or both of edges 106 and 108, in other embodiments, flange 112 comprises a pair of toes extending in opposite direction from one or both of edges 106 and 108.

In the exemplary embodiment, preform 100 is a rigid free-standing body. In other embodiments, is a fiber or fabric form that is flexible. The fiber or fabric may comprise dry carbon, carbon fiber impregnated with an epoxy or resin, or various combinations thereof.

Figure 2:
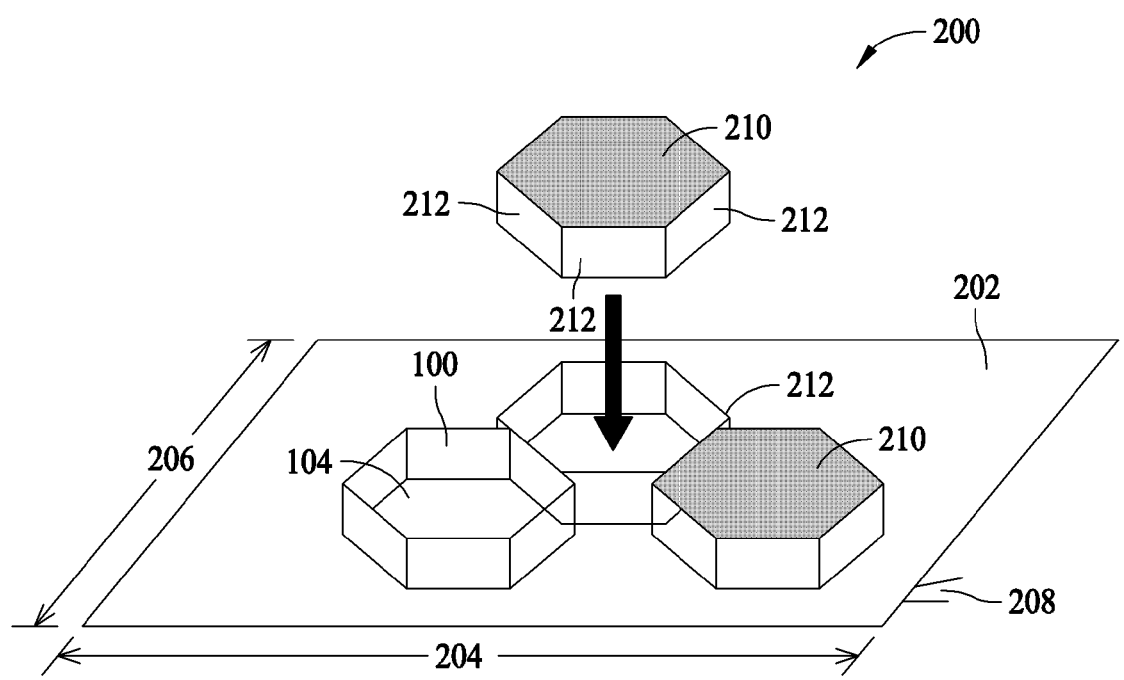
FIG. 2 is a perspective view of a partially assembled armor system that may be used with preform shown in FIG. 1.

FIG. 2 is a perspective view of a partially assembled armor system 200 that may be used with preform 100 (shown in FIG. 1). System 200 includes a face sheet 202 that includes a length 204, and a width 206, and a thickness 208. Although illustrated in FIG. 2 as being substantially rectangular, face sheet 202 may be any shape including regular and irregular shapes. In the exemplary embodiment, preform 100 is integrally formed with face sheet 202. Preform 100 is woven with face sheet 202 or is otherwise formed with face sheet 202. Face sheet 202 may comprise woven carbon fibers, carbon fiber sheet or fabric. Face sheet 202 may comprise dry fabric for infusion of resin or epoxy using a vacuum process such as but not limited to a vacuum-assisted resin transfer molding (VARTM) process. Face sheet 202 may also include a fiber such as carbon pre-impregnated with for example but not limited to resin, epoxy or combinations thereof.

System 200 includes one or more armor tiles 210 within cells 104 in complementary mating engagement. In the exemplary embodiment, cells 104 are substantially hexagonal in cross-section and tiles 210 are also substantially hexagonal in cross-section. Tiles 104 are positioned within cells 104 until all cells are filled with tiles 210. In the exemplary embodiment, armor tiles 210 comprise a ceramic material for example, but not limited to boron carbide, silicon carbide, aluminum oxide, and titanium boride. Each armor tile 210 includes perimeter surface portions 212 for mating juxtaposition with perimeter surface portions 212 of adjacent armor tiles 210 through the segments preform 100 that lie between the perimeter surface portions 212 to provide a composite layer of armor capable of withstanding and dissipating large forces, for example, upon ballistic impact and shattering of an adjacent tile. Separation of adjacent tiles 210 by preform 100 facilitates absorption of forces transmitted toward an adjacent tile and facilitates dispersing the forces towards other tiles.

Figure 3:
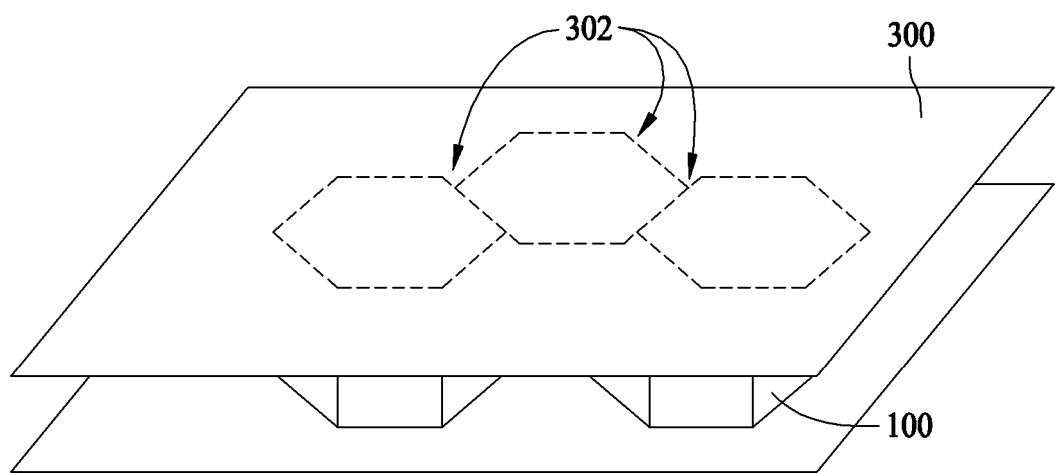
FIG. 3 is another perspective view of partially assembled armor system shown in FIG. 2.

FIG. 3 is another perspective view of partially assembled armor system 200 (shown in FIG. 2). In the exemplary embodiment, system 200 includes a second face sheet 300 coupled to preform 100. Second face sheet 300 is substantially similar to first face sheet 202, however second face sheet 300 may include differences from first face sheet 202 in various embodiments. For example, in one embodiment, described above, preform 100 is formed integrally with first face sheet 202. Moreover, face sheets 202 and 300 may comprise different materials to permit optimum performance for their respective roles. For example, face sheet 202 may be exposed to weather or the elements to a greater degree than face sheet 300 because of the orientation of system 200 on a vehicle. Face sheet 202 may require a greater UV, abrasion, and chemical resistance than face sheet 300. In the exemplary embodiment, face sheet 300 is coupled to preform 100 through flanges 112 extending from second edge 108 using stitching 302. In another embodiment, face sheet 300 is coupled to flanges 112 using an adhesive.

Figure 4:
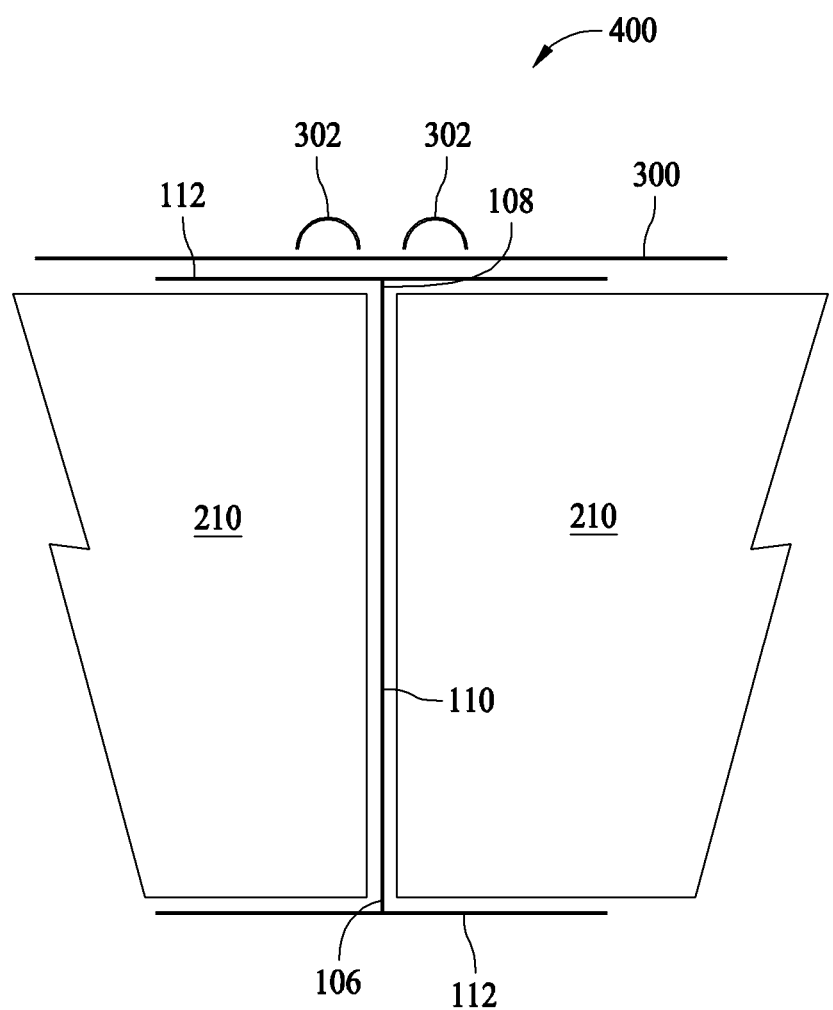
FIG. 4 is a longitudinal cross-section view of a segment of preform that may be used with system shown in FIG. 2.

FIG. 4 is a longitudinal cross-section view of a segment 400 of preform 100 that may be used with system 200 (shown in FIG. 2). In the exemplary embodiment, preform 100 includes first edge 106, second edge 108, sidewall 110, and flanges 112. Tile 210 is positioned in abutting relationship with sidewall 110 (gap shown in FIG. 4 for clarity) such that a portion of tiles 210 are covered by flanges 112. Sidewall 110 tends to provide cushioning and force dissipation between adjacent tiles 210. Flange 112 is flexible at second edge 108 such that during installation of tile 210, flange 112 is positioned vertically and when tile 210 is positioned within cell 104, flange 112 is folded perpendicular to sidewall 110 to cover a portion of tile 210. Second face sheet 300 is then coupled to flange 112 using, for example, stitching, or adhesion.

During assembly, perform 100 may be substantially rigid or semi-rigid to facilitate positioning tiles 210 within cells 104 automatically using a pick-and-place machine including for example, a robotic arm. After positioning tiles 210 within cells 104, flange 112 is folded down to be substantially flush with tiles 210. Second face sheet 300 is then stitched or otherwise attached to flange 112. If face sheets 202 and 300, and preform 100 are fabricated from dry composite material, system 200 is further infused with a resin or an epoxy using a vacuum process such as, but not limited to a vacuum-assisted resin transfer molding (VARTM) process. In another embodiment, face sheets 202 and 300, and preform 100 may be formed of a fiber such as carbon pre-impregnated with, for example, but not limited to resin, epoxy or combinations thereof. Further processing includes curing the impregnated carbon components.

Figure 5:
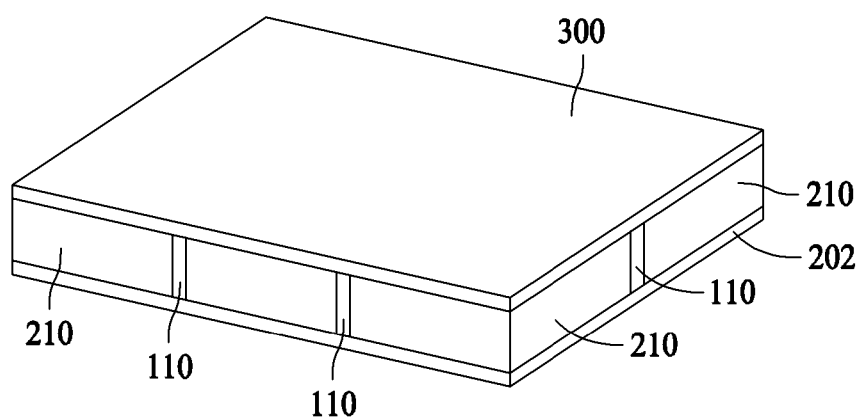
FIG. 5 is a perspective view of the exemplary armor system shown in FIGS. 1-4.

FIG. 5 is a perspective view of an exemplary armor system 200. After curing, face sheets 202 and 300, preform 100, and tiles 210 form a rigid composite armor laminate, which may be cut or machined to further match desired dimensions.

Figure 6:
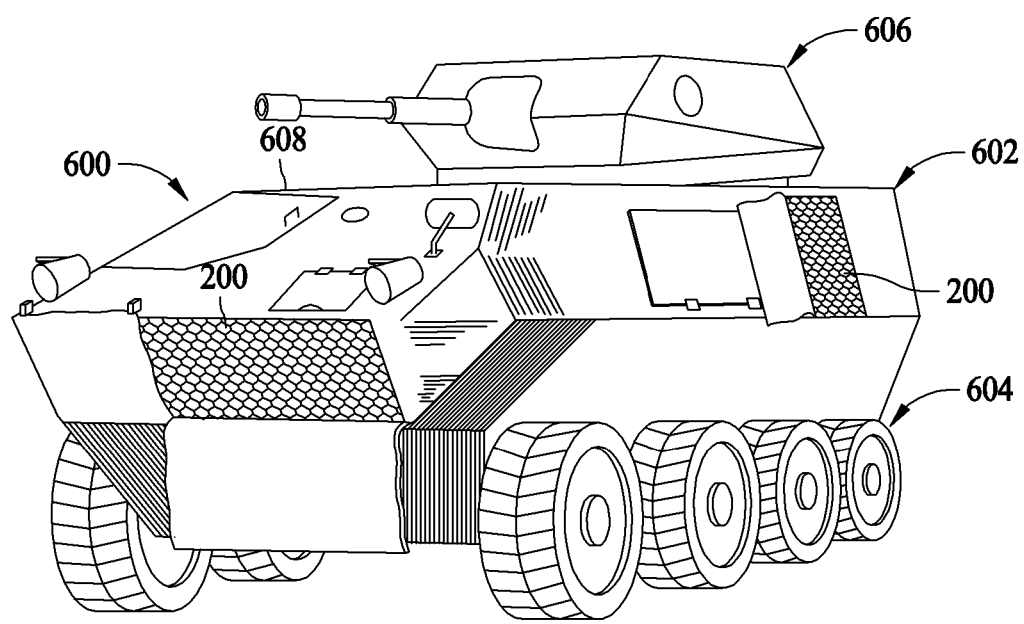
FIG. 6 is a perspective view of a light weight high mobility vehicle that includes a hull.

FIG. 6 is a perspective view of a light weight high mobility vehicle 600 that includes a hull 602 mounted on a series of driven wheels 604 or tracks, and turret 606 on hull 602. Hull 602 is constructed of steel armor plate 608. Composite armor laminate system 200 may be formed to a specific contour of a specific vehicle of area on a vehicle. In the exemplary embodiment, system 200 provides energy absorption from detonation of an explosive missile on an adjacent armor tile through preform 100. Forces applied to tiles adjacent to tiles 210 may be moderated by energy transfer to adjacent tiles through preform 110.

The above-described methods of fabricating composite armor laminate structures are cost-effective and highly reliable. The methods and systems include using a composite preform to facilitate reducing hand labor during the assembly process. The preform includes composite fabric or thread that when cured provides strength, absorption of forces between tiles and redirection of forces between tiles to transmit forces over a wider area. Accordingly, the methods and systems facilitate assembly of composite armor laminate systems in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A method of forming a ballistic resistant armor laminate, said method comprising:

forming an integral preform with a first face sheet or coupling a shaped preform to the first face sheet, wherein the preform extends from a face of the first face sheet to a distal edge, the preform circumscribing an area of the face;

positioning a tile of armor material within the area circumscribed by the preform;

forming a flange from the distal edge of the preform wherein at least a portion of a toe of the flange extends substantially parallel to the face and covers at least a portion of the tile;

coupling a second face sheet to the flange such that the preform and tile are sandwiched between the first and second face sheets; and infusing the sandwich with a resin using a vacuum.

2. A method in accordance with claim 1 further comprising shaping the preform to a size and shape complementary to a predetermined size and shape of the tile of armor material.

3. A method in accordance with claim 1 wherein at least one of the preform, the first face sheet and the second face sheet comprise a resin pre impregnated carbon fabric and wherein the method further comprises curing the at least one of the preform, the first face sheet and the second face sheet.

4. A method in accordance with claim 1 wherein coupling a shaped preform to the first face sheet comprises stitching the preform to the first face sheet.

5. A method in accordance with claim 1 wherein coupling a second face sheet to the flange comprises stitching the second face sheet to the flange.

6. A method in accordance with claim 1 wherein coupling a shaped preform to the first face sheet comprises forming the preform integrally with the first face sheet.

7. A method in accordance with claim 1 wherein coupling a shaped preform to the first face sheet comprises coupling a first edge of the preform to the first face sheet using an adhesive.

8. A method in accordance with claim 1 wherein coupling a second face sheet to the flange comprises coupling a second edge of the preform to the second face sheet using an adhesive.

9. A method in accordance with claim 1 further comprising fabricating at least one of the preform, the first face sheet, and the second face sheet using carbon and epoxy.

10. A method in accordance with claim 1 wherein positioning a tile of armor material within the area comprises positioning a tile fabricated from a ceramic within the area.

11. A method in accordance with claim 1 wherein forming a flange from the distal edge of the preform comprises forming a first toe and a second toe of the flange, the toes extending in opposite directions.

12. A method in accordance with claim 1 further comprising infusing resin into voids within and between the tile, the preform, the first face sheet, and the second face sheet.

13. A method of forming a ballistic resistant armor laminate, said method comprising:

forming an integral preform with a first face sheet or coupling a shaped preform to the first face sheet, wherein the preform extends from a face of the first face sheet to a distal edge, the preform circumscribing an area of the face;

positioning a tile of armor material within the area circumscribed by the preform;

forming a flange from the distal edge of the preform wherein at least a portion of a toe of the flange extends substantially parallel to the face and covers at least a portion of the tile; and stitching a second face sheet to the flange such that the preform and tile are sandwiched between the first and second face sheets.

14. A method of forming a ballistic resistant armor laminate, said method comprising:

forming an integral preform with a first face sheet or coupling a shaped preform to the first face sheet, wherein the preform extends from a face of the first face sheet to a distal edge, the preform circumscribing an area of the face;

positioning a tile of armor material within the area circumscribed by the preform;

forming a flange from the distal edge of the preform wherein at least a portion of a toe of the flange extends substantially parallel to the face and covers at least a portion of the tile;

coupling a second face sheet to the flange such that the preform and tile are sandwiched between the first and second face sheets; and infusing resin into voids within and between the tile, the preform, the first face sheet, and the second face sheet.

\* \* \* \* \*